United States Patent [19]

Okamura et al.

[11] Patent Number: 4,975,405

[45] Date of Patent: Dec. 4, 1990

[54] HYDRATED SILICA GEL FOR STABILIZATION TREATMENT OF BEER

[75] Inventors: Katsutoshi Okamura, Nagoya; Yasuo Esaki, Kasugai; Koichi Matsuzawa, Fujimi; Katsuhiko Asano, Takasaki, all of Japan

[73] Assignees: Fuji-Davison Chemical Ltd., Kasugai; Kirin Brewery Company Limited, Shibuya, Japan

[21] Appl. No.: 906,504

[22] Filed: Sep. 12, 1986

[30] Foreign Application Priority Data

Mar. 5, 1986 [JP] Japan ................................. 61-47847

[51] Int. Cl.$^5$ ......................... B01J 20/10; B01J 21/08
[52] U.S. Cl. .................................. 502/233; 502/407; 423/338
[58] Field of Search ....................... 502/232, 233, 407; 423/338

[56] References Cited

U.S. PATENT DOCUMENTS

| | | | |
|---|---|---|---|
| 3,070,426 | 12/1962 | Winyall | 502/232 |
| 3,975,293 | 8/1976 | LePage | 502/232 |
| 4,150,101 | 4/1979 | Schmidt et al. | 423/338 |
| 4,504,595 | 3/1985 | Jacques et al. | 423/338 |
| 4,508,742 | 4/1985 | McLaughlin | 426/330.4 |
| 4,636,394 | 1/1987 | Hsu | 502/232 |

*Primary Examiner*—Carl F. Dees
*Attorney, Agent, or Firm*—Oblon, Spivak, McClelland, Maier & Neustadt

[57] ABSTRACT

There is provided by this invention a finely divided hydrated silica gel which has a specific surface area of 530–720 m$^2$/g, preferably 550–650 m$^2$/g, a pore volume of 0.9–1.5 ml/g, preferably 1.0–1.4 ml/g, a mean pore diameter of 50–120 Å, preferably 60–100 Å, a water content of 7–25% by weight, preferably 8–13% by weight (wet weight basis), and moreover the pH of which as a 5% aqueous suspension is 6.0–8.0, thereby producing a silica gel suitable for stabilization treatment of beer, and for reduction of the colloidal components in beer.

6 Claims, 1 Drawing Sheet

HYDRATED SILICA GEL FOR STABILIZATION TREATMENT OF BEER

BACKGROUND OF INVENTION

1. Field of the Invention:

This invention relates to a hydrated silica gel for stabilization treatment of beer for improving the haze stability of beer, and more specifically to a hydrated silica gel as a filtration aid for providing good quality beer which does not generate haze, for example, even when beer is stored for a prolonged time after being packed into bottles (or cans or barrels).

2. Description of the Prior Art:

Beer is a fermentation product produced from (malt of) barley and hop as main starting materials, and in the case of light-colored beer, its amber-colored, bright and transparent appearance is also one of great product characteristics. However, if the stability of beer is not adequate, when the beer is stored for a prolonged time after packed into bottles (or cans or barrels) or when it is cooled for drinking, it causes haze and therefore there is a problem that its product value is deteriorated.

This haze is more specifically classified into three: chill haze which is brought about when beer is cooled to about 0° C. but solubilized again when warmed to 20° C.; permanent (or oxidized) haze which is no longer solubilized even when beer is warmed to 20° C.; and frozen haze which is brought about when beer is frozen or stored at a temperature near the freezing point ($-5°$ C.). Of those, what dominate the product value of beer are cold haze and permanent haze, and these haze are brought about by a change in the beer components, and generated by the association of colloidal components such as certain proteins, polyphenols etc. Further, this tendency shows that the longer the storing period of beer, the higher the degree of haze, since the affinity to the proteins is increased when the polyphenols are oxidized. The colloidal components of these proteins, polyphenols etc. are derived from the starting materials, i.e., barley, hop etc. and hence are inevitable components in beer and thus this problem is inherently present with beer.

Therefore, in order to prevent the haze of beer, it is necessary to reduce these colloidal components causing these haze in beer, and it has heretofore been generally employed for this purpose, for example, a method which comprises treating beer with a haze inhibiting (stabilizing treating) agent such as papain, tannic acid, PVPP (polyvinyl polypyrrolidone), silica gel etc. Inter alia, the silica gel is widely used since it does not exert great influences on the taste, foam or other qualities of beer.

For example, British Patent No. 938,153 discloses the use of an acid-treated silica xerogel which has a specific surface area of 200–400 $m^2/g$, a pore volume of 0.6–1.2 ml/g, a pore diameter of 60–150 Å and a pH as its 5% aqueous suspension of 4.5–7.0 when clarifying beer, and further British Patent No. 98175 also discloses the use of an acid-treated silica xerogel which has a specific surface area of 200–600 $m^2/g$, a pore volume of 0.5–1.5 ml/g, a pore diameter of 40–180 Å and a pH as its 5% aqueous suspension of 4.0–8.0 when clarifying beer. Furthermore, British Patent No. 1279250 discloses the use of a silica xerogel which has a specific surface area of 700–1200 $m^2/g$, a pore volume of 0.7 ml/g or more and a mean pore diameter of 25–80 Å when clarifying beer, and British Patent No. 1215928 discloses the use of a silica hydrogel which has a specific surface are of 700 $m^2/g$ or more, a mean pore diameter of 30–120 Å and a pH as its 5% aqueous suspension of 1.5–2.0 when clarifying beer. However, in the case of the known silica xerogel or silica hydrogel as described above, although some effect could be obtained, it has not been satisfactory. In short, in the case of silica gel, various types having different physical property values may be obtained depending on the production conditions, but when these are applied to the stabilization treatment of beer, the basic principles reside in:

1. selective adsorption and removal of proteins (or association products thereof with polyphenols) which are one of colloidal components causing haze due to the surface silanol groups, and 2. selective capture and removal of substances causing the formation of haze by a gel permeation mechanism based on the pore structure and the pore diameter distribution, and therefore it is necessary to precisely select the respective physical property values of the silica gel suitable for the beer treatment.

SUMMARY OF THE INVENTION

A first object of this invention is to produce a silica gel suitable for stabilization treatment of beer.

A second object of this invention is to produce a silica gel most suitable for protein stabilization treatment of beer and moreover which does not deteriorate the characteristics inherent to beer such as flavors, taste, foam etc. of beer.

A third object of this invention is to produce a silica gel which reduces the colloidal components in beer.

A fourth object of this invention is to produce a silica gel which can prevent the generation of haze of beer, especially cold haze and permanent haze.

A fifth object of this invention is to produce a silica gel also having good protein adsorbing ability.

A sixth object of this invention is to produce a silica gel which does not cause the contamination of beer due to microorganisms.

Accordingly, there is provided by this invention a finely divided hydrated silica gel which has a specific surface area of 530–720 $m^2/g$, preferably 550–650 $m^2/g$, a pore volume of 0.9–1.5 ml/g, preferably 1.0–1.4 ml/g, a mean pore diameter of 50–120 Å, preferably 60–100 Å, a water content of 7–25% by weight, preferably 8–13% by weight (wet weight basis), and moreover the pH of which as a 5% aqueous suspension is 6.0–8.0.

DETAILED DESCRIPTION OF THE PREFERRED EMBODIMENTS

Figure 1:
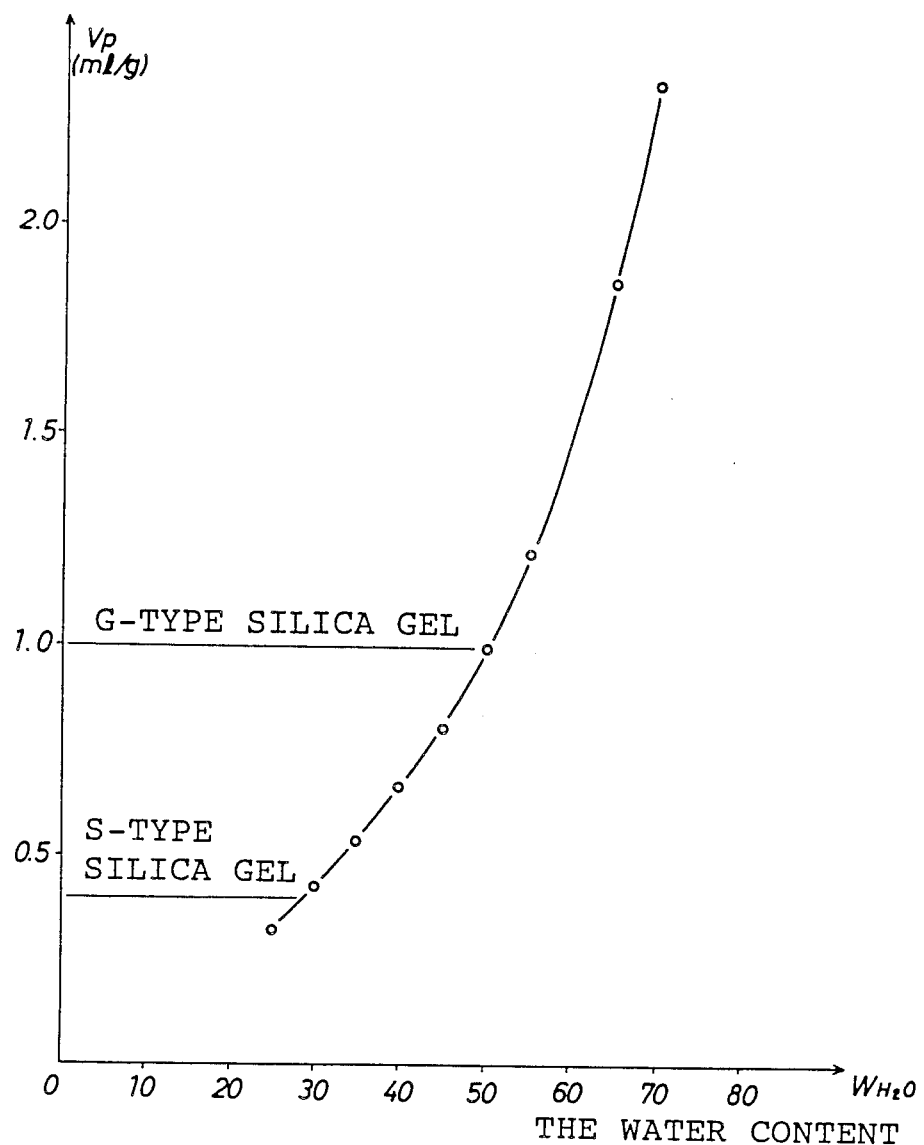
FIG. 1 is a graph showing the relationship between the water content and the pore volume on dehydration of silica hydrogel.

This invention resides in a hydrated silica gel with specific physical property values having strictly controlled specific surface area, pore volume, mean pore diameter, water content and pH, and by using this, colloidal components such as proteins, polyphenols etc. contained in beer can be efficiently adsorbed and removed without deteriorating beer characteristics such as flavors, taste, foam etc. of beer, and as a result, good quality beer which does not bring about cold haze or permanent haze even when stored for a prolonged time may be obtained. Such an effect is a special effect exerted by the use of the silica gel of this invention, and this is remarkably excellent as compared with the case of the above-described known silica xerogel or silica hydrogel but if the respective physical property values specified in this invention depart from the ranges, an expected level of effect cannot be obtained.

The "hydrated silica gel" specified by this invention and the known "silica xerogel" or "silica hydrogel" are distinctly different in their compositions. In this point, while it may be clearly understood by reference to Ralph K. Iller, "The Chemistry of Silica", A. Wiley-Interscience Publication, the classification according to their physical properties will be briefly explained. In general, the silica gel produced by a wet process is composed of a three-dimensional network structure in which non-porous, noncrystalline silica colloidal particles of 1–100 μm are combined with one another by siloxane bonds, and the sum of the respective surface areas of the silica colloidal particles constituting the unit weight is a specific surface area, and the space surrounded by the three-dimensional network structure of these silica colloidal particles is the pore volume. For example, where the silica gel is produced from a sodium silicate aqueous solution and sulfuric acid, monosilicic acid [$Si(OH)_4$] is formed by the hydrolysis of the sodium silicate, and further by the dehydration condensation of the monosilicic acid, polysilicic acid particles of a colloidal dimension is formed, thereby yielding a liquid substance, the so-called silica sol. On this occasion, the size of the colloidal particles is influenced by the $SiO_2$ concentration, the salt concentration, the pH etc. Thereafter the respective colloidal particles in the silica sol coagulate to form a three-dimensional network structure, and finally the silica sol loses flowability and becomes a gelatin-like mass. That in this condition is called the "silica hydrogel" which, after removing the contained sodium silicate and the sodium sulfate produced from sulfuric acid by washing process with water, etc., comprises water in an amount depending on the initial silica hydrosol and silicon dioxide and other minor components, and, for example, that produced by a general process comprises ca. 70% water and ca. 30% silicon dioxide. Thus, that obtained by dehydrating the "silica hydrogel" is the "silica xerogel". The feature of the silica hydrogel is that the space of the colloidal particle three-dimensional network structure (i.e. pore volume)is fully saturated with water and with the progress of the dehydration by drying, its space, i.e., pore volume is contracted (reduced). This phenomenon takes place because since the bond of the colloidal particles in the silica hydrogel is not strong, the packed condition of the colloidal particles undergoes a change due to the contraction force resulting from the surface tension on the gas/liquid interface when water evaporates. The pore volume [$V_P$] of the silica hydrogel may be described by the following equation:

$$V_p = \frac{{}^W H_2O}{100 - {}^W H_2O} \; [ml/g]$$

where ${}^W H_2O$ is the water content of the silica hydrogel on the wet weight basis [wt %].

FIG. 1 is a graph showing the relationship between the water content and the pore volume on dehydration based on the above equation. However, when the silica hydrogel is dehydrated to a certain water content, the packed condition of the colloidal particles is fixed constant and the pore volume is no longer changed (the graph such as in FIG. 1 is no longer established), and on that point, the silica xerogel structure is formed. According to Barby, it is reported that in the case of a G-type xerogel (specific surface area ≈350 m²/g, pore volume 1.0–1.2 ml/g), a xerogel structure is formed at a water content of 50% or its vicinity, while in the case of an S-type xerogel (specific surface area ≈800 m²/g, pore volume ≈0.4 ml/g), it is formed at a water content of 29% or its vicinity (see D. Barby, "Characterization of Powder Surface", p. 376–378, Academic Press).

Further, the surface area reduces as does the pore volume until the silica hydrogel. This is because low molecular weight silicic acid is dissolved with the interporous water content as a medium and crystallizes on the colloidal particle surface and hence the surface condition is changed, and further because the three-dimensional packed condition of the colloidal particles is changed due to the contraction force on dehydration; and the degree of this surface area reduction varies depending on the temperature, time, pH etc. on dehydration. Therefore, the mean pore diameter of the silica hydrogel is also changed on dehydration. In other words, the mean pore diameter [dap] may be calculated by the following equation:

$$dap = \frac{40000 \times V_p}{As} \; [Å]$$

where As is the specific surface area [m²/g]. As compared with the great reduction in the pore volume on dehydration, the reduction in the specific surface area is extremely small, and therefore the mean pore diameter is gradually reduced until the silica xerogel structure has been formed. For example, supposing that the specific surface area of the silica hydrogel is substantially constant 500 m²/g, when the water content is reduced from 70% to 40%, the pore volume filled with water is reduced from 2.3 ml/g to 0.67 ml/g, and so is the mean pore diameter from 184 Å to 54 Å.

In other words, the "silica hydrogel" and the "silica xerogel" may be distinguished in such way that the "silica hydrogel" undergoes reductions in both pore volume and specific surface area in the course of dehydration and is a structurally unstable state wherein the inside of the pores is always filled with water, while the inside of the pores is always filled with water, while that the "silica xerogel" means a stucturally stable state wherein a strong colloidal particle three-dimensional network structure (silica xerogel structure) is formed by complete dehydration, and neither pore volume nor specific surface area undergo much change by rehydration and redehydration. The "hydrated silica gel" in accordance with this invention means a silica gel from a state where no more reduction in the pore volume occurs in the course of dehydration of the "silica hydrogel", i.e., a strong colloidal particle three-dimentional structure (silica xerogel structure) has been formed and also still hydrated to a state immediately before becoming the "silica xerogel". In short, the hydrated silica gel in accordance with this invention is a silica gel having a silica xerogel structure in a hydrated state. As described, silica gel is delicately different in the structure and the physical properties, but in the case of this invention, only the hydrated silica gel having the above-described characteristic values can selectively exert an excellent effect.

The hydrated silica gel of this invention is characterized by that the water content is controlled to 7-25% by weight in the course of dehydration of the silica hydrogel to the silica xerogel in order to strictly control the surface area in an aspect of the adsorption capacity and also the pore diameter and the pore volume in an aspect of the substance diffusion; and in a hydrated substance such as silica hydrogel etc., if a microorganism deposits thereon, there is a threat that said microorganism proliferates and grows, and when it is added to beer, there is a possibility of contaminating the beer. In general, in a hydrated substance, an AW value (activity of water) is known as an index representing the possibility of proliferation and growth of a microorganism, and each microorganism has an inherent AW value range which permits proliferation, and therefore, if it is below said lower limit, proliferation is impossible even if the other factors are optimum. For example, it is known that for colitis germs, the AW lower limit is 0.96, the AW lower limit for yeast 0.88 and the AW for mold is 0.80. In the case of silica gel, at a water content of 60% by weight, the AW value is above 0.97, and at 40% by weight, the AW value is 0.86, and at 20% by weight, the AW value is 0.63. Therefore, by restricting the water content of the silica gel below this AW lower limit inherent to the microorganism. On the other hand, as another method for inhibiting this proliferation of a microorganism, it is known to maintain the pH of the silica gel extremely low, but it has a drawback that when beer and such a low pH silica gel are contacted with each other, an acidic substance elutes and deteriorates the flavors of the beer, and therefore it is not practical. Since the hydrated silica gel of this invention has a water content of 7-20% and an AW value of 0.62 or below, it can exert an extremely excellent effect without contaminating the beer due to microorganisms in the beer treatment or without bringing about deterioration of the flavors due to the pH. The hydrated silica gel having the specific physical property values of this invention may be prepared in a manner known in the silica industry. That is, it may be prepared by uniformly mixing an aqueous solution of an alkali silicate, such as alkali metal silicates e.g., sodium silicate, potassium silicate, lithium silicate etc., ammonium silicate etc. with an aqueous solution of either inorganic acid such as sulfuric acid, hydrochloric acid, nitric acid etc. or organic acid such as acetic acid etc. to generated a silica sol, gelling it under conditions not forming precipitates to obtain a silica hydrogel, then removing water soluble salts by washing process with water, allowing it to age if necessary, and thereafter either conducting dehydration to the predetermined water content with heated air, heated steam etc. and subsequently particle size control by grinding, or conducting particle size control by grinding and subsequently dehydration, or simultaneously conducting dehydration and particle size control. As a method for dehydration, oven drying, band drying, rotary kiln drying, high frequency drying or any other known suitable method may be employed; as a method for grinding, roll mill, ball mill, hammer mill, free grinder, jet mill or any other known suitable method may be employed; and dehydration, a method which combines the above-described grinding method with heated air or heated steam or any other known suitable method may be employed. However, when the uniformity of the respective hydrated silica gel particles is taken into consideration, it is preferred to simultaneously conduct grinding and dehydration.

On removing water-soluble substances such as formed salts from the silica hydrogel by washing with water, it is essential to use clean water of pH 6-8 free from impurities, and by this, the hydrated silica gel of this invention can give a pH of 6-8 when made into a 5% aqueous suspension, and therefore it is possible to restrict the water-soluble substances [see Official Gazette Published on Aug. 27, 1983 (extra special issue No. 14), Compositional Specification for Food Additives; Silicon Dioxide, Purity Tests: Section of (1) Water-soluble Substances] not greater than 25 mg, which is extremely suitable for the beer treatment. In other words, where the pH of the silica gel used for the beer treatment is extremely low, for example, pH 2-3, or where it is extremely high, for example, pH 9-10, it means that acid components or alkali components corresponding thereto elute from the silica gel into the beer, and they cause a problem of deteriorating the flavors characteristic of the beer. Regarding the particle diameter distribution range of the finely divided hydrated silica gel, an optimum particle diameter may be obtained by appropriately selecting the contact time with the beer and further the method for separating the hydrated silica gel and the beer, and it is preferably 1-100 $\mu$m.

In this invention, operations for obtaining a spherical silica gel may be conducted in a conventional manner. For example, Japanese Patent Publication No. 13834/1973 discloses that a silica sol generated by mixing an alkali silicate aqueous solution and an acid solution is dispersed and released into a gas phase medium, e.g., air, and gelled while flying to produce a spherical silica gel. Further, Japanese Patent Publication No. 4113/1951 discloses that a silica gel produced by mixing an alkali silicate aqueous solution and an acid solution is suspended and floated in a hydrophobic organic solvent to produced a spherical silica gel. In the case of a microspherical silica hydrogel by such a production process, a hydrated silica gel may be produced by first removing formed salts by washing with water, and thereafter dehydrating to the predetermined water content by spray drying, fluidized bed drying etc. or any other known suitable method, without pulverizing.

The hydrated silica gel of this invention may be produced by the known processes as described above, and any thereof may be employed, but it is necessary to finally produce, a hydrated silica gel having the above-specified specific surface area, pore volume, mean pore diameter, water content and pH.

On the other hand, general production procedures for beer are as follows:

(1) ground malt (grist) is placed in a mash tun for saccharification together with water, and while the temperature is gradually raised from 45°-55° C. to 75°-80° C. over 2-3 hours, starch in the malt is decomposed into sugars such as maltose etc. and dextrin etc.

(2) the mash after the saccharification is filtered to obtain a clear malt liquor (wort), and the extract in the product is taken out.

(3) hop is added to the filtered malt liquor, and boiled from about an hour to 1-2 hours.

(4) the hot wort is transferred to a precipitation tank and, after removing hot coagulates, cooled to 5°-10° C.

(5) a yeast is added to the cooled wort, and an oxygen is supplied to promote the growth of the yeast.

(6) fermentation is effected at a temperature of about 10° C. for a week (primary fermentation).

(7) secondary-fermentation and aging are effected in a storage tank at low temperatures of about 0° to −1° C. for 1–2 months.

(8) filtration is effected using diatomaceous earth etc. followed by packing into bottles (or cans or barrels).

In order to use the hydrated silica gel of this invention, it is directly brought into contact with the beer in washing solution set forth in Table 1 to effect removal of soluble salts and aging.

Thereafter, this silica hydrogel was hot air dried in a shelf-type hot air drier to the desired water content, and then finely ground by an air jet mill to obtain a hydrated silica gel having the respective physical property values set forth in Table 1.

TABLE 1

| NO. | WASHING SOLUTION | SPECIF. SURFACE AREA (m²/g) | PORE VOLUME (ml/g) | MEAN PORE DIAMETER (Å) | WATER CONTENT (wt %) | pH | MEAN PARTICLE DIAMETER (μm) |
| --- | --- | --- | --- | --- | --- | --- | --- |
| EX. 1 | TAP WATER pH = 7.5 | 579 | 0.97 | 67 | 7.3 | 7.7 | 11.0 |
| COMP. EX. 1 | AQUEOUS SULFURIC ACID pH = 5.5 | 789 | 0.50 | 25 | 29.3 | 6.2 | 13.5 |
| COMP. EX. 2 | AQUEOUS SULFURIC ACID pH = 3.0 | 888 | — | — | 64.9 | 4.5 | 14.3 |
| COMP. EX. 3 | TAP WATER pH = 7.5 | 517 | 1.12 | 87 | 29.0 | 7.7 | 13.3 |
| COMP. EX. 4 | TAP WATER pH = 7.5 | 529 | 0.89 | 67 | 33.4 | 7.8 | 12.2 |
| COMP. EX. 5 | AMMONIA WATER pH = 8.5 | 244 | 1.75 | 287 | 21.9 | 8.7 | 12.5 | or between the above-described steps (7) and (8), and this operation is effected by e.g. adding the hydrated silica gel to the beer in the storage tank, or body feeding it into the beer during the filtration step. In this course, the colloidal components causing haze in the beer are adsorbed and removed by the hydrated silica gel. Of course, the hydrated silica gel is completely separated from the beer by a filter and does not remain in the final product.

In general, the amount of the hydrated silica gel used is 0.3–1 g per liter of the beer. Further, the contacting time of the hydrated silica gel with the beer is, for example, about 5–30 minutes where used in the filtering step. The temperature at that occasion is generally about +5° to −2° C.

The beer obtained by such a contacting treatment has good stability, and is of a high quality which does not bring about haze in the beer even when stored for a prolonged time. Further, it does not exert any influence on the other characteristics of the beer per se.

This invention is more particularly described by the following examples, but it should be noted that this invention is not restricted by the description of the following examples unless it departs from the scope.

EXAMPLE 1, COMPARATIVE EXAMPLES 1–5 AND REFERENCE EXAMPLE 1

[Preparation of a Hydrated Silica Gel]

The predetermined amounts of a sodium silicate aqueous solution [$SiO_2$ 20.0 wt %] and 12N sulfuric acid were charged into a mixer having a strong shearing force to prepare a uniform silica sol having an excess acid concentration of 1.0N, then, the silica sol was left to stand at room temperature for 2 hours to permit adequate polymerization thereby effecting gellation, to obtain a uniform transparent block silica hydrogel, and thereafter this silica hydrogel was washed with the The respective physical property values of the hydrated silica gel in this invention are values determined by the following procedures:

(1) Specific Surface Area (m²/g):

The sample was dipped in methanol, then, after displacing the water content in the pores with methanol, dried in an oven at 180° C., and determined by a simple nitrogen adsorption method (rapid surface area measuring device, model SA-1000 produced by Shibata Kagaku-ki Kogyo K.K.).

(2) Pore Volume (ml/g):

The sample was dipped in methanol, then, after displacing the water content in the pores with methanol, dried in an oven at 180° C., and determined by a nitrogen adsorption method (see R. W. Cranston, F. A. Inkley: Adv. m. Catalysis 9, 143 (1957)) at a nitrogen relative pressure of 0.931.

(3) Mean Pore Diameter (Å)

It was determined by the following equation:

$$\text{Mean Pore Diameter } [d_{ap}] = \frac{40000 \times \text{Pore Volume } [V_0]}{\text{Specific Surface Area } [A_s]} \; [\text{Å}]$$

where $A_s$ is the specific surface area [m²/g].

(4) Water Content (wt %):

The sample was dried in an oven at 180° C., and determined by the following equation:

$$wH_2O = \frac{W1 - W2}{W2} \times 100$$

[wt % wet basis]
where
W1 is the weight before drying, and
W2 is the weight after drying.

(5) pH:

The sample was suspended in 100 cc of ion exchanged water, stirred for 10 minutes, and determined using pH electrodes.

(6) Mean Particle Diameter:

It was determined by Coulter counter method. This is a method which comprises measuring the particle diameter by a change in the electrical resistance value generated when the suspended particles in the electrolyte pass through the aperture (pore) (Coulter Counter Model Taii Coulter Electronics, Inc.).

[Stabilization Treatment of Beer]

Young beer immediately after the primary fermentation in a brewery was stored in a storage tank 1 month while cooling to −1° C., and when this beer was filtered through diatomaceous earth, stabilization treatment was effected by adding the various hydrated silica gels prepared above in amounts of 0.5g per liter of the beer. This beer was bottled, and subjected to a stability test to obtain the results set forth in Table 2.

In addition to the treatment with the various silica gels, the results when treated with purified papain at 2.5 mg/l (proteolytic activity 500-600 PU/l) (added in the storage tank) are also included as Reference Example for reference.

for 2 weeks at 50° C. more or less corresponds to the case where stored for 6 months at 20° C.

(3) Chill Haze after Storage for 2 Weeks at 50° C.:

The above described beer stored at 50° C. was further placed in a thermostatic bath at 0° C., then, after allowing the chill haze to deposit for 24 hours, the turbidity was measured at a temperature of 0° C. using a haze meter. (Notes) The units of turbidity of (1)-(3) (EBCf. u.) and the conditions of turbidity as observed to the naked eyes are in the following relationships:

| | |
|---|---|
| 0–1 EBCf. u. | Clear |
| 1–2 EBCf. u. | Very slight turbidity is observed |
| 2–4 EBCf. u. | Light turbidity is observed |
| 4–8 EBCf. u. | Turbid |
| 8 or higher EBCf. u. | Remarkably turbid |

(4) Total Nitrogen:

The proteins in the beer were hydrolyzed and the nitrogen content was measured according to Kjeldahl method.

(5) Polyphenols:

Measured according to the EBC method.

(6) Color:

Measured according to the method.

TABLE 2

| ANALYSIS ITEM | EX. 1 | COMP. EX. 1 | COMP. EX. 2 | COMP. EX. 3 | COMP. EX. 4 | COMP. EX. 5 | REF. EX. 1 |
|---|---|---|---|---|---|---|---|
| TURBIDITY ON THE DAY OF PRODUCTION (EBCf. u.) | 0.43 | 0.43 | 0.41 | 0.42 | 0.43 | 0.42 | 0.41 |
| TURBIDITY AFTER STORAGE FOR 2 WEEKS AT 50° C. (EBCf. u.) | 0.44 | 0.47 | 0.45 | 0.44 | 0.47 | 0.46 | 0.50 |
| CHILL HAZE AFTER STORAGE FOR 2 WEEKS at 50° C. (EBCf. u.) | 3.5 | 10.9 | 5.9 | 4.5 | 5.6 | 5.4 | 4.5 |
| TOTAL NITROGEN (mg/100 g) | 55.0 | 56.7 | 56.6 | 56.7 | 56.8 | 56.5 | 55.6 |
| POLYPHENOLS (mg/l) | 137 | 140 | 137 | 135 | 138 | 138 | 139 |
| COLOR (EBCu.) | 7.2 | 7.5 | 7.5 | 7.4 | 7.2 | 7.5 | 7.5 |
| HEAD (FOAM) FORMATION (ml) | 83 | 79 | 68 | 84 | 80 | 69 | 69 |
| HEAD (FOAM) RETENTION (SECOND) | 177 | 179 | 147 | 170 | 196 | 149 | 122 |
| BEER TASTE | AS REF. EX. 1 | AS REF. EX. 1 | AS REF. EX. 1 | AS REF. EX. 1 | AS REF. EX. 1 | AS REF. EX. 1 | — |

Stability tests of the beer were conducted according to the procedures described below:

(1) Turbidity on the Day of Production:

The beer on the day when bottled after the treatment was measured for the turbidity at a temperature of 20° C. using a haze meter.

(2) Turbidity after Storage of 2 Weeks at 50° C.:

The beer bottled after the treatment was placed in a thermostatic chamber at 50° C., stored for 2 weeks to promote degradation, after which the turbidity of the beer was measured at a temperature of 20° C. using a haze meter. The turbidity of degradation when stored (7) Head (foam) Formation:

The beer at 8° C. was poured a glass from a height of 3 cm above the top of the glass, the amount of foam (ml) when the foam was grown to top end was read from the calibration on the glass.

(8) Head (foam) Retention:

The time to when the foam in (7) disappeared and the beer liquid surface was revealed was measured (seconds).

(9) Beer Taste:

The test beer treated with the hydrated silica gel and the control beer (treated with purified papain) were compared by drinking by a pair test or b triangle test as fresh and after storage.

EXAMPLE 2, COMPARATIVE EXAMPLES 6–8 AND REFERENCE EXAMPLE 2

Similarly as in Example 1, when the beer after the predetermined period of storage was filtered through diatomaceous earth, the hydrated silica gel used in example 1a commercial silica hydrogel and a silica xerogel were added in amounts of 0.5 g per liter of the beer respectively to effect stabilization treatment, and the stability test results are shown in Table 3. For reference, the results when treated with purified papain at 2.5 mg/l (protein decomposing activity 500–600 PU/l) in a manner similar to that in Example 1 are also included therein. The physical property values of the products Company A, Company B and Company C set forth in Table 3 are summarized in Table 3a.

TABLE 3

| ANALYSIS ITEM | EX. 2 | COMP. EX. 6 SILICA HYDROGEL COMPANY A PRODUCT | COMP. EX. 7 SILICA HYDROGEL COMPANY B PRODUCT | COMP. EX. 8 SILICA XEROGEL COMPANY C PRODUCT | REF. EX. 2 PURIFIED PAPAIN |
| --- | --- | --- | --- | --- | --- |
| TURBIDITY ON THE DAY OF PRODUCTION (EBCf. u.) | 0.39 | 0.40 | 0.42 | 0.44 | 0.41 |
| TURBIDITY AFTER STORAGE FOR 2 WEEKS AT 50° C. (EBCf. u.) | 0.45 | 0.47 | 0.48 | 0.47 | 0.48 |
| CHILL HAZE AFTER STORAGE FOR 2 WEEKS AT 50° C. (EBCf. u.) | 2.27 | 3.78 | 6.60 | 6.71 | 3.61 |
| TOTAL NITROGEN (mg/100 g) | 55.5 | 54.5 | 55.2 | 55.3 | 56.1 |
| POLYPHENOLS (mg/l) | 141 | 144 | 147 | 144 | 149 |
| COLOR (EBCu.) | 7.2 | 7.2 | 7.2 | 7.2 | 7.5 |
| HEAD (FOAM) FORMATION (ml) | 74 | 68 | 71 | 80 | 56 |
| HEAD (FOAM) RETENTION (SECOND) | 170 | 181 | 164 | 164 | 123 |
| BEER TASTE | AS REF. EX. 2 | AS REF. EX. 2 | AS REF. EX. 2 | AS REF. EX. 2 | — |

TABLE 3a

| | COMPANY A PRODUCT | COMPANY B PRODUCT | COMPANY C PRODUCT |
| --- | --- | --- | --- |
| SPECIFIC SURFACE AREA m²/g | 861 | 825 | 279 |
| PORE VOLUME ml/g | 1.66 | 2.09 | 1.31 |
| MEAN PORE DIAMETER Å | 77 | 101 | 188 |
| WATER CONTENT % | 63.1 | 52.4 | 9.3 |
| PARTICLE DIAMETER μm | 11.0 | 15.5 | 5.08 |
| PH | 3.29 | 3.39 | 5.08 |

EXAMPLES 3–16 AND COMPARATIVE EXAMPLES 9–11

Young beer immediately after the primary fermentation in a brewery was filtered while stirring using diatomaceous earth to remove yeast and suspended substances. To this filtered beer was added the hydrated silica gel showing the physical property values set forth in Table 4 in an amount of 0.5 g per liter of the beer, stirred for 20 minutes, and filtered through a membrane filter of 0.8μ, thereby effecting stabilization treatment.

When the obtained beer samples were subjected to a relative protein adsorption ability test by SASPL to obtain the results set forth in the same table.

TABLE 4

| NO. | SPECIFIC SURFACE AREA ($m^2/g$) | MEAN PARTICLE DIAMETER ($\mu m$) | pH | WATER CONTENT (wt %) | RELATIVE PROTEIN ADSORPTION ABILITY BY SASPL [NOTE] |
|---|---|---|---|---|---|
| EX. 3 | 572 | 15.0 | 7.5 | 8.7 | 100.0 |
| EX. 4 | 714 | 27.6 | 7.3 | 9.4 | 90.0 |
| EX. 5 | 673 | 27.4 | 7.3 | 10.7 | 97.7 |
| EX. 6 | 660 | 27.0 | 7.6 | 12.4 | 101.8 |
| EX. 7 | 639 | 14.2 | 7.3 | 13.0 | 101.0 |
| EX. 8 | 620 | 22.0 | 7.3 | 9.0 | 100.7 |
| EX. 9 | 604 | 19.0 | 7.2 | 8.4 | 100.0 |
| EX. 10 | 600 | 14.3 | 7.5 | 9.4 | 102.4 |
| EX. 11 | 595 | 14.0 | 7.7 | 8.9 | 101.2 |
| EX. 12 | 580 | 15.1 | 7.5 | 9.1 | 100.0 |
| EX. 13 | 565 | 14.0 | 7.7 | 8.8 | 101.0 |
| EX. 14 | 555 | 14.5 | 7.4 | 8.8 | 99.4 |
| EX. 15 | 543 | 13.9 | 7.5 | 8.7 | 100.1 |
| EX. 16 | 530 | 12.7 | 7.4 | 8.3 | 92.6 |
| COMP. EX. 9 | 525 | 12.7 | 7.5 | 5.5 | 75.5 |
| COMP. EX. 10 | 309 | 14.2 | 7.5 | 6.1 | 55.6 |
| COMP. EX. 11 | COMMERCIAL SILICA HYDROGEL (COMPANY A PRODUCT) | | | | 69.0 |

[Note]

Relative Protein Adsorption Ability by SASPL (Saturated Ammonium Sulfate Precipitation Limit)

To 50 ml of the stirred beer sample was added dropwise a saturated ammonium sulfate solution, and the turbidity at 660 nm was continuously observed; and the amount of the saturated ammonium sulfate solution added until the turbidity suddenly increased was measured to determine the SASPL of this beer sample (see James, S. Hough, MBAA Technical Quarterly, 13, 34 [1976]).

Then, using the SASPL value in Example 3 as a standard, each relative protein adsorption ability was determined by the following equation, and expressed as a value relative to that of Example 3 taken as [100.0].

$$\frac{S - B}{C - B} \times 100$$

where

S: SASPL value of the beer treated with the test silica gel,

B: Blank SASPL value (non-treated beer),

C: SASPL value of the standard hydrated silica gel (Example 3).

From the results set forth in the above respective tables, it is clear that when the hydrated silica gel of this invention was used, especially chill haze may be prevented without deteriorating the taste or foam properties of beer, and the protein adsorption ability is also good.

While the preferred embodiment of the invention has been described, it is to be understood that the invention is not limited thereto, and may be otherwise embodied within the scope of the following claims.

What is claimed is:

1. A hydrated silica gel having a silica xerogel structure for a stabilizing treatment of beer, said silica gel having a specific surface area of 530–720 $m^2/g$, a pore volume of 0.9–1.5 ml/g, a mean pore diameter of 50–120 Å, a water content of 7–25% by weight (wet weight basis) and a pH of 6.0–8.0 as a 5% aqueous suspension.

2. The hydrated silica gel according to claim 1, wherein said silica gel, in a hydrated state of colloidal particles, has a three-dimensional network structure.

3. The hydrated silica gel according to claim 2, wherein said silica gel has an activity of water value less than 0.62.

4. The hydrated silica gel having a silica xerogel structure according to claim 1, wherein said specific surface area ranges from 550–650 $m^2/g$, said pore volume ranges from 1.0–1.4 ml/g, said mean pore diameter ranges from 60–100 Å and said water content ranges from 8–13% by weight on a wet basis.

5. A hydrated silica gel for stabilizing beer, said silica gel having a specific surface area of 530–720 $m^2/g$, a pore volume of 0.9–1.5 ml/g, a mean pore diameter of 50–120Å, a water content of 7–25% by weight (wet weight basis), a pH of 6.0–8.0, as a 5% aqueous suspension, and a saturated ammonium sulfate precipitation limit ranging from 90.0 to 102.4.

6. A hydrated silica gel having a xerogel structure and a specific surface area of 530–720 $m^2/g$, a pore volume of 0.9–1.5 ml/g, a mean pore diameter of 50–120 Å, a water content of 7–25% by weight (wet weight basis) and a pH of which a 5% aqueous suspension is 6.0 to 8.0, prepared by a process comprising:

preparing a silica hydrogel; and drying said silica hydrogel while the water content of the silica is controlled within the range of 7–25% by weight.

* * * * *